United States Patent
Cha et al.

(10) Patent No.: US 10,627,500 B2
(45) Date of Patent: Apr. 21, 2020

(54) OCCUPANCY DETECTION APPARATUS AND METHOD FOR CONTROLLING THE SAME

(71) Applicant: LG ELECTRONICS INC., Seoul (KR)

(72) Inventors: Byoungkeun Cha, Seoul (KR); Jinseo Son, Seoul (KR); Kyeungjae Kim, Seoul (KR); Sangchul Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 15/671,480

(22) Filed: Aug. 8, 2017

(65) Prior Publication Data

US 2018/0038949 A1 Feb. 8, 2018

(30) Foreign Application Priority Data

Aug. 8, 2016 (KR) .................. 10-2016-0100645

(51) Int. Cl.
*G01S 13/04* (2006.01)
*G01S 13/56* (2006.01)
(Continued)

(52) U.S. Cl.
CPC .............. *G01S 13/04* (2013.01); *F24F 11/30* (2018.01); *G01S 13/0209* (2013.01);
(Continued)

(58) Field of Classification Search
CPC combination set(s) only.
See application file for complete search history.

(56) References Cited

U.S. PATENT DOCUMENTS

| 9,632,177 B2 | 4/2017 | Inagaki et al. |
| 2006/0250264 A1 | 11/2006 | Cutler et al. |

(Continued)

FOREIGN PATENT DOCUMENTS

| JP | 2013-096828 | 5/2013 |
| JP | 2014-232070 | 12/2014 |
| JP | 2015-190777 | 11/2015 |
| KR | 10-2015-0109882 | 10/2015 |
| WO | WO 2008/001092 | 1/2008 |

OTHER PUBLICATIONS

European Search Report dated Jan. 4, 2018 issued in Application No. 17185315.3.

(Continued)

*Primary Examiner* — Mamadou L Diallo
(74) *Attorney, Agent, or Firm* — KED & Associates, LLP

(57) ABSTRACT

An occupancy detection apparatus and a method for controlling the same are disclosed. The occupancy detection apparatus may include a transmitter including one transmission antenna for outputting a transmission signal, a receiver including a first reception antenna and a second reception antenna, each for receiving a reflected signal corresponding to the transmission signal, and a processor for eliminating a background signal corresponding to a background from each of the reflected signals, and extracting a signal reflected from an occupant from each of the reflected signals by extracting a correlation between the transmission signal and the reflected signal free of the background signal.

19 Claims, 25 Drawing Sheets

(51) Int. Cl.
*G01S 13/42* (2006.01)
*G01S 13/02* (2006.01)
*F24F 11/30* (2018.01)
*G01S 13/06* (2006.01)
*G01S 13/12* (2006.01)
*G01S 13/48* (2006.01)
*G01S 13/524* (2006.01)
*G01S 13/538* (2006.01)
*F24F 120/10* (2018.01)

(52) U.S. Cl.
CPC .............. *G01S 13/06* (2013.01); *G01S 13/12* (2013.01); *G01S 13/42* (2013.01); *G01S 13/48* (2013.01); *G01S 13/5244* (2013.01); *G01S 13/56* (2013.01); *F24F 2120/10* (2018.01); *G01S 13/538* (2013.01)

(56) References Cited

U.S. PATENT DOCUMENTS

| | | |
|---|---|---|
| 2008/0100498 A1 | 5/2008 | Fullerton et al. |
| 2011/0057831 A1 | 3/2011 | Shinomiya et al. |
| 2014/0159941 A1 | 6/2014 | Yasugi et al. |
| 2016/0180175 A1* | 6/2016 | Bitton ................ G06K 9/00771 348/143 |
| 2017/0123058 A1* | 5/2017 | Yavari ..................... G01S 13/56 |
| 2018/0109339 A1* | 4/2018 | Mostofi ................ H04B 17/318 |
| 2019/0187266 A1* | 6/2019 | Yamanouchi ........... G01S 7/354 |

OTHER PUBLICATIONS

International Search Report dated Sep. 19, 2017 issued in Application No. PCT/KR2017/005513.

* cited by examiner

FIG. 15
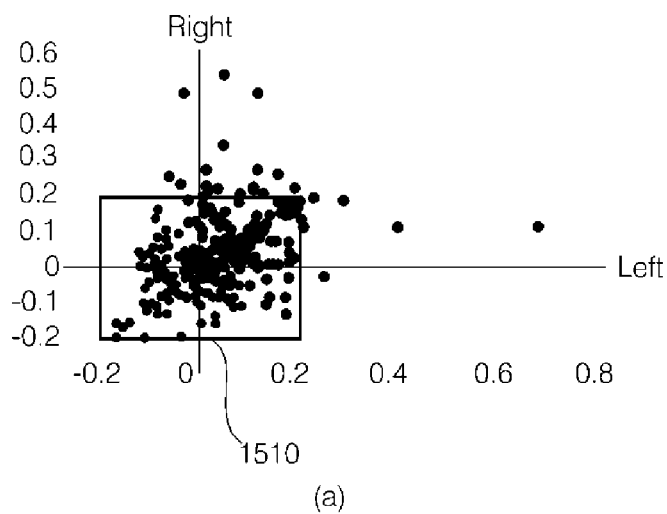
(a)
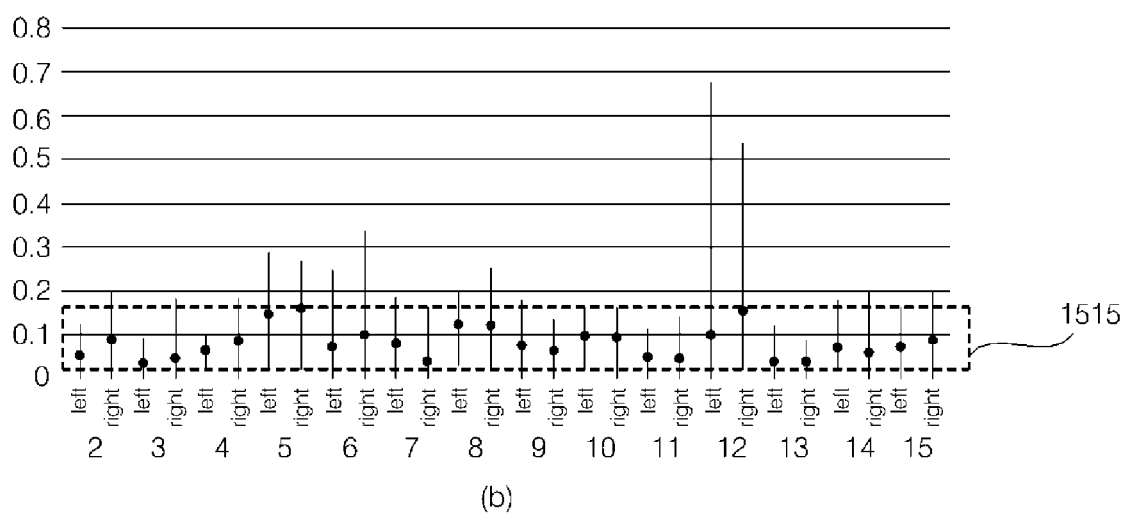
(b)

OCCUPANCY DETECTION APPARATUS AND METHOD FOR CONTROLLING THE SAME

CROSS-REFERENCE TO RELATED APPLICATION

This application claims priority under 35 U.S.C. § 119 to Korean Application No. 10-2016-0100645, filed on Aug. 8, 2016, whose entire disclosure is hereby incorporated by reference.

BACKGROUND

1. Field

The present disclosure relates to an occupancy detection apparatus and a method for controlling the same, and more particularly, to an occupancy detection apparatus based on Impulse Response-Ultra Wide Band (IR-UWB), and a method for controlling the same.

2. Background

Offices, schools, clinics, a common living space in a house, and buildings provide necessary services to users. For example, a Heating, Ventilation, Air Conditioning (HVAC) system is a representative facility system that offers a service. Such a service is provided using an energy source like electricity or gas. Korea Energy Agency publicized the results of an analysis of energy consumption characteristics of each domestic sector in 2014, which reveal that a building sector occupies about 24.2% of the total domestic energy consumption, and the energy increase rate of the building sector is higher than an industrial sector and a transportation sector.

It is expected that the energy consumption of the building sector will further be increased due to the trend toward large buildings and enhanced convenience. Accordingly, reduction of energy in buildings may lead to a great decrease in total energy consumption. In order to reduce the energy consumption of a building without making users feel uncomfortable, more and more research has recently been conducted on intelligent control techniques for providing as much an illumination service and a heating and cooling service as needed only at a necessary time instant.

For intelligent control, energy consumption is estimated based on an energy consumption model and a service is controlled according to the estimated energy consumption, or a service is controlled based on a user's location. According to the energy consumption model-based estimation control scheme, a building under control and facilities (a chiller, a cooling tower, a pump, and so on) in the building are modeled, and an energy consumption is estimated. An optimum facility operation scheme is provided based on the estimated energy consumption, thereby saving energy. For this purpose, a technology of modeling a building and facilities in the building, and accurate indoor/outdoor state information about the building determined by means of various sensors (for sensing a flow rate, temperature/humidity, and so on) are required. To build this system in the building, the initial investment is huge.

According to the location-based control scheme, a service is provided based on the location of a user in a building. The illumination and cooling/heating of an empty space are turned off, and a service is provided adaptively to a place in which a user is located, thereby saving energy. Because a number of services may be provided by indoor location sensing, multi-sided research has been made to sense a motion of a person and locate the person in an indoor environment.

Conventionally, occupancy is detected by a sensor or Radio Frequency (RF). However, the conventional method has limitations in providing a service by detecting the accurate location and distance of an object in a large space due to its constraint in terms of installation of a plurality of sensors and accuracy.

FIG. 1 is a simplified conceptual view illustrating a conventional occupancy detection apparatus using a Passive InfraRed (PIR) sensor. The PIR sensor, also called a moving InfraRed (IR) detector, senses an object that radiates IR light. Every object having a temperature above the absolute temperature zero radiates IR light, and the temperature (36.5° C.) of a human body is representable within an IR range. The occupancy detection apparatus using a PIR sensor includes an IR radiator 10 and a light receiving sensor 30. IR light emitted from the IR radiator 10 is reflected from a person 20. The light receiving sensor 30 may sense reflected light 31, and accordingly determine whether there is any occupant.

Owing to its cheap price and sensitiveness to a motion, the PIR sensor is mostly used indoors. However, the high sensitivity of the PIR sensor to sun light, a flash, or temperature may lead to malfunction of the PIR sensor. Moreover, since the PIR sensor is capable of determining only the presence or absence of a moving object in a space, it is difficult to provide a per-location service in a large space with the PIR sensor. In other words, since the PIR sensor determines only the presence or absence of any person in a sensing space and does not determine the location of a person, the PIR sensor may not be used in a large conference room. Although a technique of conducting communication between PIR sensors has also been studied to locate a person in a large space, such a technique requires use of a plurality of PIR sensors.

FIG. 2 is a simplified conceptual view illustrating a conventional Impulse Response-Ultra Wide Band (IR-UWB)-based occupancy detection apparatus, and FIG. 3 is a graph illustrating the spectrums of a UWB scheme and other schemes, referred to for describing UWB. Referring to FIG. 2, the conventional IR-UWB-based occupancy detection apparatus includes at least three radar modules 41a, 41b, and 41c, and a controller 42. Each of the radar modules 41a, 41b, and 41c may include one transmission antenna and one reception antenna, output an impulse signal, and receive a reflected signal.

Referring to the frequency spectrums illustrated in FIG. 3, a UWB system 61 is designed by a wireless transmission technology in which digital data is transmitted in an ultra-wide frequency band with very low power. The UWB system 61 has a relatively low spectrum across a very wide frequency band, compared to a conventional narrow band system 63 or a conventional wideband Code Division Multiple Access (CDMA) system 65. The UWB-based location sensing or occupancy detection scheme consumes low power and is robust against a jamming and multi-path environment. Due to its high accuracy of location detection, the UWB-based location sensing or occupancy detection scheme is widely used in determining an accurate distance.

UWB-based schemes are classified into a carrier-based scheme and an impulse-based (carrier-free) scheme. In general, a scheme of calculating a distance using the Time of Arrival (ToA) of IR reflected waves is often used. This takes the advantage of high distance measurement accuracy that UWB offers due to non-use of a carrier and use of very short pulses, such as nanosecond (nsec) pulses.

However, despite the high distance measurement accuracy, the conventional IR-UWB-based scheme suffers from an installation limitation in that a location can be determined only through a plurality of pieces of equipment. Referring to FIG. 2, conventionally, the three or more radar modules 41a, 41b, and 41c are installed indoors and information about a distance to an occupant 50 is collected through the radar modules 41a, 41b, and 41c, in order to determine the location of the occupant 50.

Since each of the radar modules 41a, 41b, and 41c includes a pair of transmission and reception antennas, it is capable of simply measuring only a distance. To locate the occupant 50 accurately, the distances measured by the radar modules 41a, 41b, and 41c should be subjected to triangulation. Therefore, the controller 42 should be additionally provided to collect sensing data from the plurality of radar modules 41a, 41b, and 41c, to thereby sense an occupant, and each of the controller 42 and the radar modules 41a, 41b, and 41c should have a communication module for communication. That is, the conventional occupancy detection scheme requires the three or more radar modules 41a, 41b, and 41c, for sensing the person 50, and additionally, the controller 42 for performing a positioning algorithm. As a result, the number of modules and cost for occupancy detection are increased.

Further, the conventional radar modules 41a, 41b, and 41c sense a distance of about 6 to 7 m. To sense the occupant 50 in a large space spanning 10 m or larger, a double or more of the sensors are required. To determine a distance and a location through a single device by dividing a large space into smaller zones without imposing constraints on users, hardware and an algorithm other than used in the conventional approaches need to be designed. In this context, active research is conducted on a technique of locating a user indoors through a single device to perform location-based control and thus save energy in a building.

BRIEF DESCRIPTION OF THE DRAWINGS

The embodiments will be described in detail with reference to the following drawings in which like reference numerals refer to like elements wherein:

FIGS. 8 to 17 are views referred to for describing a method for controlling an occupancy detection apparatus according to an embodiment of the present disclosure.

DETAILED DESCRIPTION

Figure 1:
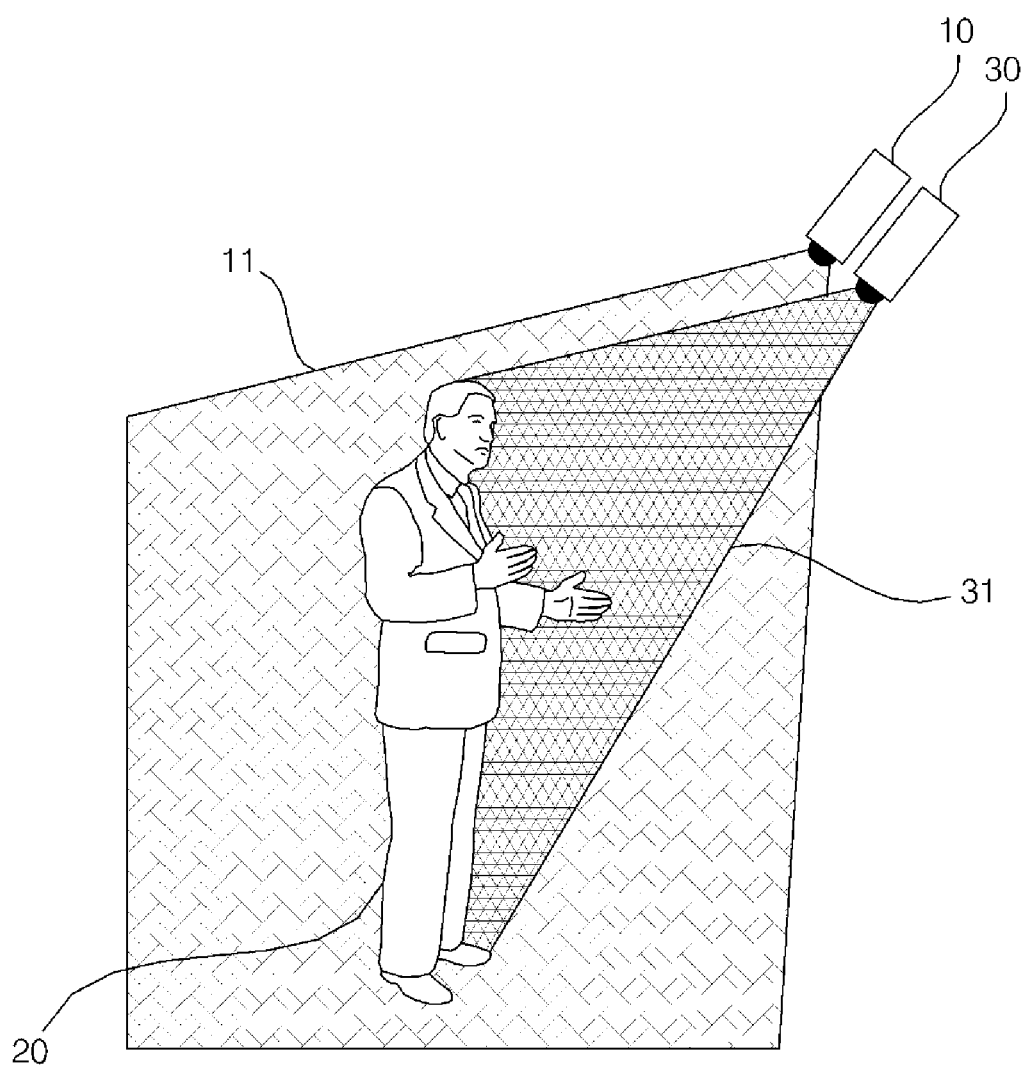
FIG. 1 is a simplified conceptual view of a conventional occupancy detection apparatus using a Passive InfraRed (PIR) sensor.
Figure 2:
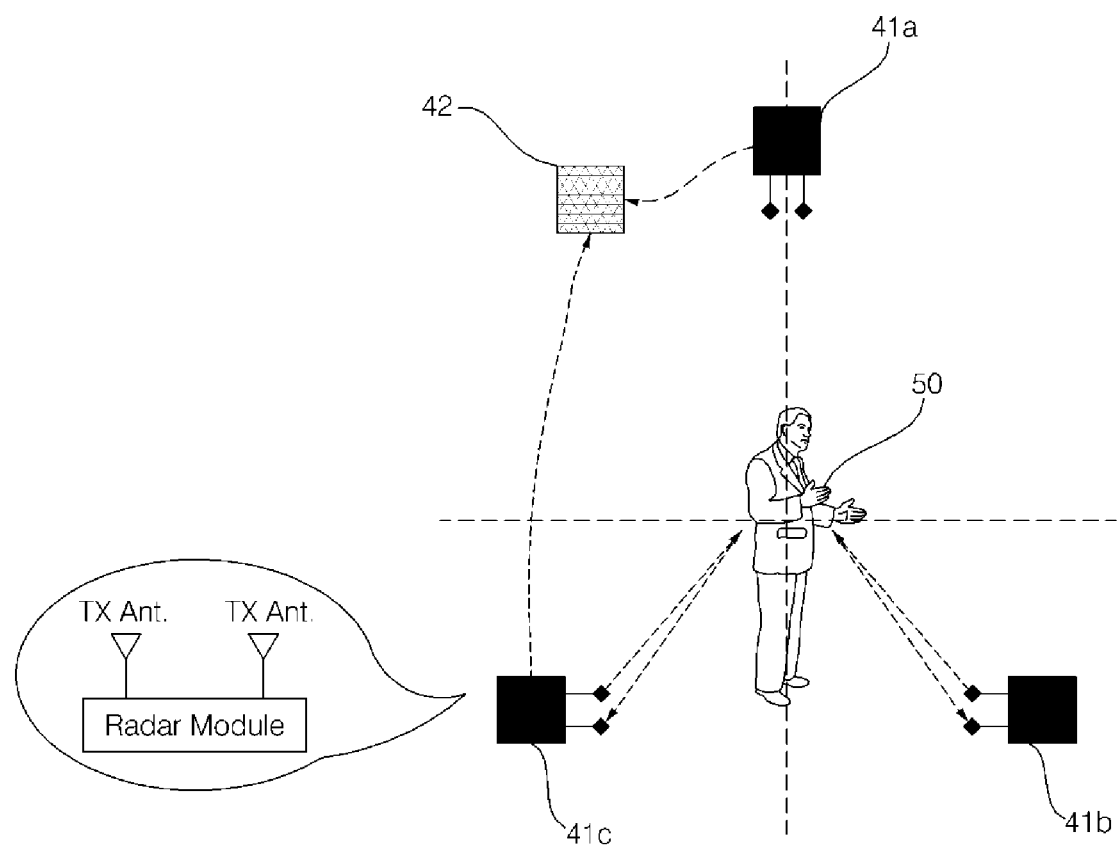
FIG. 2 is a simplified conceptual view of a conventional Impulse Response-Ultra Wide Band (IR-UWB)-based occupancy detection apparatus.
Figure 3:
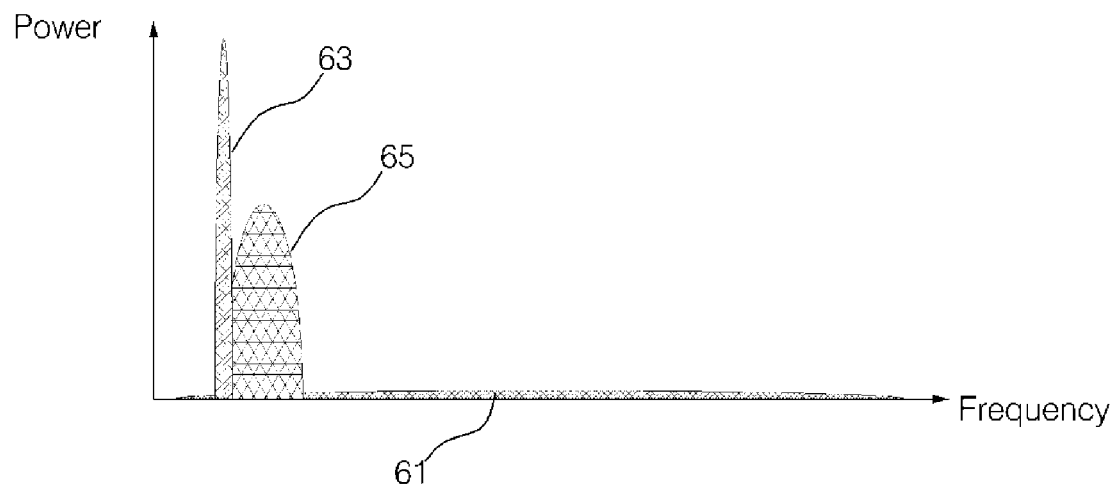
FIG. 3 is a view referred to for describing UWB.

Embodiments of the present disclosure will be described below in detail with reference to the attached drawings. However, the embodiments do not limit the present disclosure, and various modifications may be made to the present disclosure.

To describe the present disclosure clearly and simply, a part with no relation to the present disclosure is not illustrated in the drawings, and like reference numerals denote the same or very similar components throughout the specification. The terms 'module' and 'unit' used to signify components are used herein to help the understanding of the components and thus they should not be considered as having specific meanings or roles. Accordingly, the terms 'module' and 'unit' may be used interchangeably.

Figure 4:
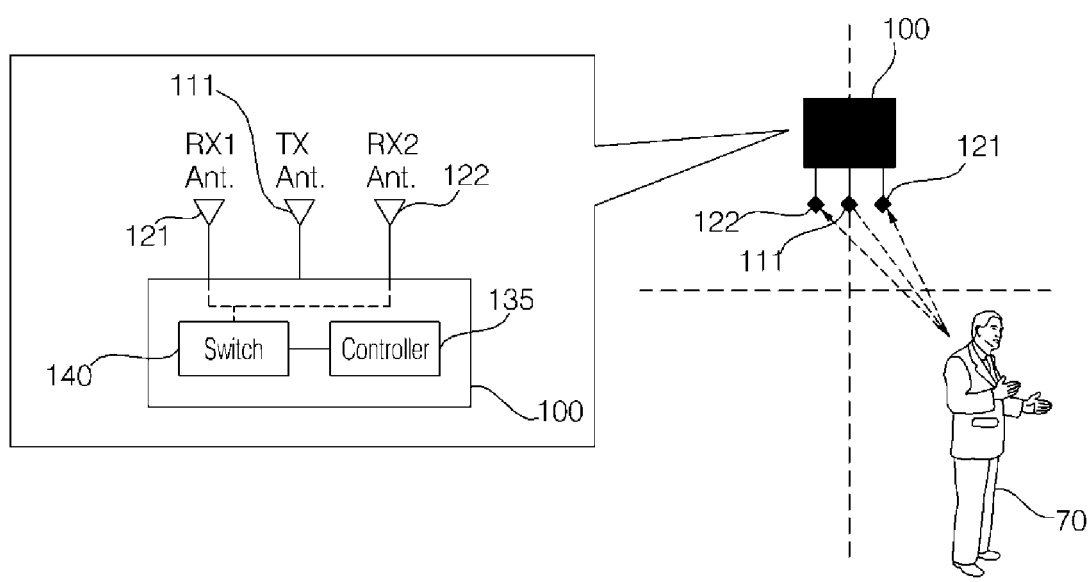
FIG. 4 is a simplified conceptual view of an occupancy detection apparatus according to an embodiment of the present disclosure.

FIG. 4 is a simplified conceptual view illustrating an occupancy detection apparatus according to an embodiment of the present disclosure. Referring to FIG. 4, as the location of an occupant 70 is detected by a single occupancy detection apparatus 100 in an occupancy detection method according to an embodiment of the present disclosure, the number of occupancy sensors may be reduced and thus the configuration of occupancy sensors may be simplified.

According to an embodiment of the present disclosure, the occupancy detection apparatus (or occupancy detection sensor) 100 may be configured to include one transmission antenna 111 and two reception antennas 121 and 122. The occupancy detection apparatus 100 senses and tracks the location of an occupant by processing two signals received from the two reception antennas 121 and 122 in real time. A switch 140 may switch between the first and second reception antennas 121 and 122, and periodically collect two reception signals from the reception antennas 121 and 122. According to an embodiment, the switch 140 may operate under the control of a controller 135.

A received signal may be an impulse response resulting from reflection of an impulse signal output from the transmission antenna 111 from an external object or person. The occupancy detection apparatus 100 may also calculate a per-distance signal level based on the average value of a predetermined number of received signals during processing of the received signals, and use the calculated per-distance signal level as data for occupancy detection.

The occupancy detection apparatus 100 may eliminate a signal generated from a background from each of the received signals and perform dynamic background subtraction on a motion. Subsequently, the occupancy detection apparatus 100 may extract a correlation with the transmission signal from a background differential signal, and thus extract only a signal reflected from the occupant 70 from the received signal.

The occupancy detection apparatus 100 may determine whether a detected object is actually a person by selecting only a peak signal matching to an occupant signal characteristic from among extracted signals. Further, the occupancy detection apparatus 100 may select a target according to a direction from which the target enters a sensing range, and track the location of the target based on the histories of signals received from the left and right first and second reception antennas 121 and 122, and the speed of the occupant.

According to the present disclosure, illumination/Heating, Ventilation, Air Conditioning (HVAC) may be controlled intelligently and a service may be provided to users as much as needed, through occupancy detection. According to the present disclosure, the occupancy detection apparatus is easily installed, reduces cost, and is capable of long-distance occupancy detection by pre-processing a received signal, compared to a conventional occupancy detection apparatus. According to an embodiment of the present disclosure, the occupancy detection apparatus may sense a plurality of zones through a single piece of equipment by location tracking. With reference to the attached drawings, an occupancy detection apparatus and a method for controlling the same according to an embodiment of the present disclosure will be described below in detail.

Figure 5A:
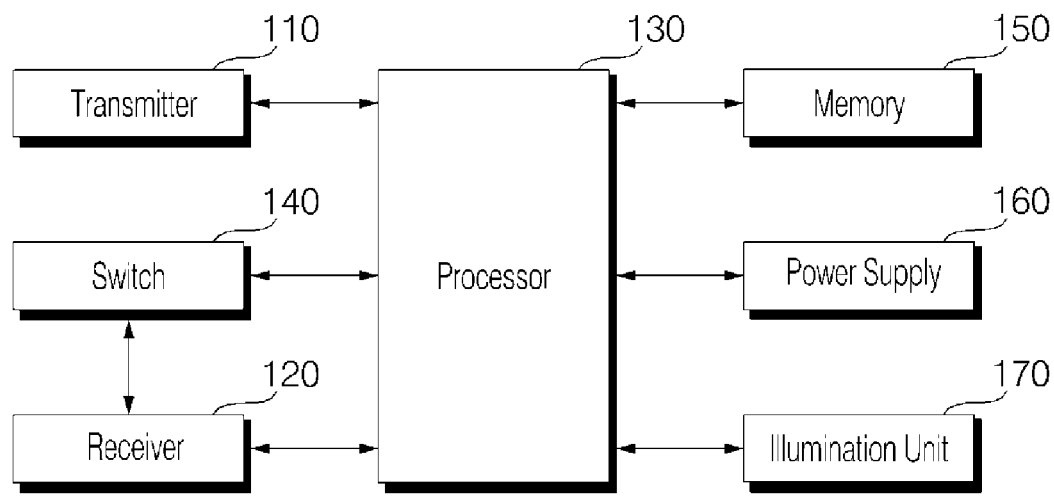
FIGS. 5A and 5B are block diagrams of occupancy detection apparatuses according to embodiments of the present disclosure.
Figure 5B:
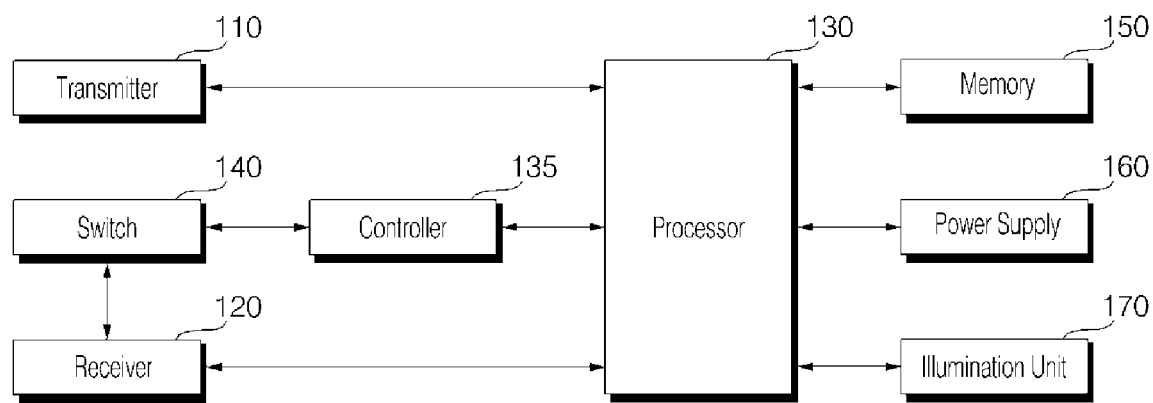
Figure 6:
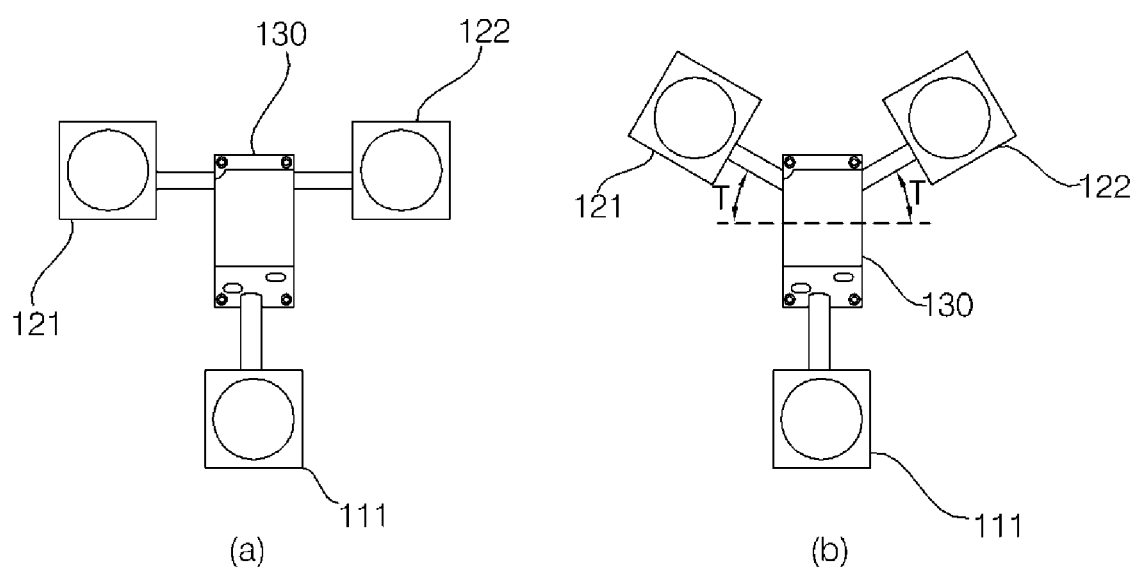
FIG. 6 is a view referred to for describing antenna layouts in an occupancy detection apparatus according to an embodiment of the present disclosure.
Figure 7:
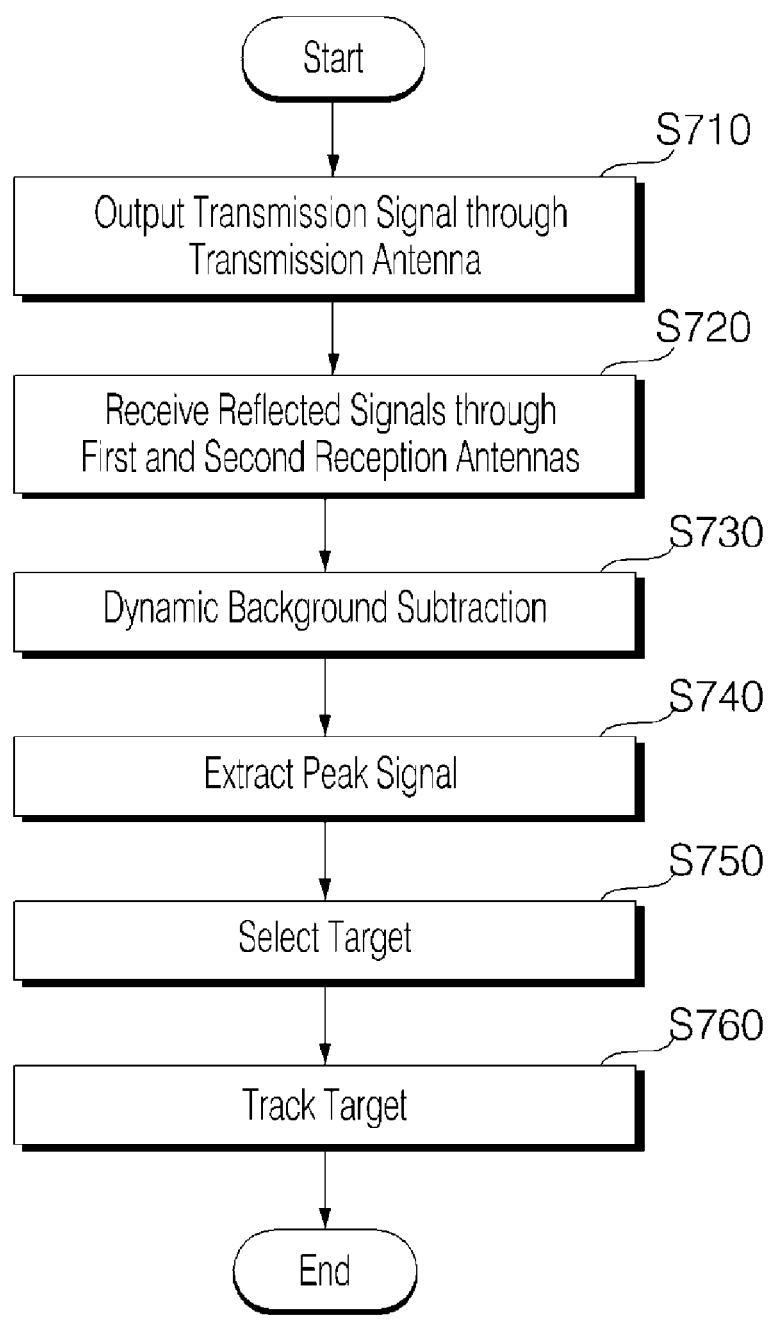
FIG. 7 is a flowchart illustrating a method for controlling an occupancy detection apparatus according to an embodiment of the present disclosure.

FIGS. 5A and 5B are block diagrams of occupancy detection apparatuses according to embodiments of the present disclosure, and FIG. 6 is a view referred to for describing antenna layouts in an occupancy detection apparatus according to an embodiment of the present disclosure. FIG. 7 is a flowchart illustrating a method for controlling an occupancy detection apparatus according to an embodiment of the present disclosure, and FIGS. 8 to 17 are views referred to for describing a method for controlling an occupancy detection apparatus according to an embodiment of the present disclosure.

Referring to the drawings, each of occupancy detection apparatuses 100a and 100b according to embodiments of the present disclosure may include a transmitter 110 including the single transmission antenna 111 for outputting a transmission signal, a receiver 120 including the first and second reception antennas 121 and 122 for receiving reflected signals corresponding to the transmission signal, and a processor 130 for processing the reflected signals.

The transmitter 110 may output a transmission signal to the outside (S710). For example, the transmitter 110 may generate an IR-UWB impulse signal and output the IR-UWB impulse signal to the outside. For this purpose, the transmitter 110 may further include an impulse generator (not shown). In this case, the impulse generator may generate an IR-UWB impulse signal based on data for generation of a transmission signal, provided by the processor 130.

Alternatively or additionally, the processor 130 may have the functionality of the impulse generator, and thus may generate a transmission signal and output the transmission signal to the outside through the transmission antenna 111. The processor 130 may be a kind of transceiver serving as a transmitter and a receiver. The processor 130 may have a bandwidth filter and thus may extract and process a signal in a predetermined frequency band.

Preferably, the transmission antenna 111 of the transmitter 110 is a directional antenna. Meanwhile, the receiver 120, which includes the first and second reception antennas 121 and 122, may receive a signal which has been output from the transmitter 110 and reflected from an external object or a person (S720).

The processor 130 may provide overall control to each of the occupancy detection apparatuses 100a and 100b, and process a signal for occupancy detection. The processor 130 may perform signal processing for the average value of signals repeatedly received a predetermined number of times through the first and second reception antennas 121 and 122. According to an embodiment, the processor 130 may control alternate switching between the first and second reception antennas 121 and 122 so that a plurality of reflected signals may be collected periodically through each of the first and second reception antennas 122.

Alternatively or additionally, each of the occupancy detection apparatuses 100a and 100b may further include a switch 140 for alternately switching between the first and second reception antennas 121 and 122 so that a plurality of reflected signals may be collected periodically through each of the first and second reception antennas 122. In this case, the occupancy detection apparatus 100b according to an embodiment of the present disclosure may further include the dedicated controller 135 for controlling the switch 140.

Preferably, the first and second reception antennas 121 and 122 of the receiver 120 are directional antennas.

According to an embodiment of the present disclosure, a lens may be attached to each of the transmission antenna 111 and the first and second reception antennas 121 and 122 so that a transmission and reception angle may be narrowed and a transmission and reception distance may be increased.

Referring to sections (a) and (b) of FIG. 6, the first and second reception antennas 121 and 122 are preferably arranged to be symmetrical with respect to the processor 130 and the transmission antenna 111. As illustrated in section (a) of FIG. 6, the first reception antenna 121, the second reception antenna 122, and the transmission antenna 111 may be arranged in the form of 'T'. As illustrated in (b) of FIG. 6, the first reception antenna 121, the second reception antenna 122, and the transmission antenna 111 may be arranged in the form of 'Y'.

According to an embodiment of the present disclosure, each of the occupancy detection apparatuses 100a and 100b may further include a memory 150 for storing data and an algorithm required for operations. Further, the memory 150 may store and manage reflected signals received through the receiver 120.

According to an embodiment of the present disclosure, each of the occupancy detection apparatuses 100a and 100b may further include a power supply 160 for receiving internal or external power and supplying required power to each component under the control of the processor 130. The power supply 160 may include one or more batteries and, in this case, the batteries may be chargeable built-in ones. When needed, a battery may be detachably engaged with a body of each of the occupancy detection apparatuses 100a and 100b.

The power supply 160 may include a connection port which may be configured as an exemplary interface electrically connected to an external charger for supplying power to charge the battery. Further, the power supply 160 may be configured to charge the battery wirelessly without using the connection port. In this case, the power supply 160 may receive power by at least one of an inductive coupling scheme based on magnetic induction from an external wireless power transmitter, and a magnetic resonance coupling scheme based on electromagnetic resonance.

According to an embodiment of the present disclosure, each of the occupancy detection apparatuses 100a and 100b may further include an illumination unit 170 for outputting light in one or more colors. At least one light source is provided inside the illumination unit 170 and is preferably a Light Emitting Diode (LED). The illumination unit 170 may output light for power, communication, or an operation failure in each of the occupancy detection apparatuses 100a and 100b. The illumination unit 170 may output light in different colors according to power, communication, or operation states of each of the occupancy detection apparatuses 100a and 100b. According to an embodiment of the present disclosure, each of the occupancy detection apparatuses 100a and 100b may further include a communication unit (not shown) for outputting light in one or more colors.

The processor 130 may process a reflected signal corresponding to a transmission signal and thus acquires per-sample signal strengths. Herein, a sample tracked target may be configured to be about 4 mm long (unit).

For this processed signal (original signal), a peak signal is selected through filtering, background subtraction, and cross-correlation. A basic signal process may be performed in the manner/order of a CLEAN algorithm. The processor 130 may perform dynamic background subtraction on the reflected signals received through the first and second reception antennas 121 and 122 (S730). The original signal of the reflected signals is subjected to background subtraction so that a background signal (also referred to as background noise) may be eliminated (S730). The received reflected signals contain a signal reflected from a stationary neighboring object as well as a signal reflected from a target. Thus, the signal reflected from the neighboring object should be processed and eliminated as a background. This process is called background subtraction. The processor 130 may eliminate a background signal corresponding to the background from the reflected signals by background subtraction (S730).

The processor 130 may extract a correlation with the transmission signal from the signals free of the background signal (also referred to as processed reflected signals or processed received signaled), and extract signals reflected from an occupant in the reflected signals (S740). The correlation extraction is a process of searching for a signal matching to a transmission signal by cross-correlation. The processor 130 excludes a signal determined to be noise with no similarity to and correlation with the transmission signal from the reflected signals.

Subsequently, the processor 130 extracts peak signals matching to an occupant signal characteristic (a threshold) from the extracted signals (S740), and select a target based on the peak signals (S750). In the peak signal extraction step S740, the processor 130 may extract a peak signal from each of the signals received from the first and second reception antennas 121 and 122. The processor 130 may track the location of the target based on the histories of the signals received through the first and second reception antennas 121 and 122 (S760).

Figure 8:
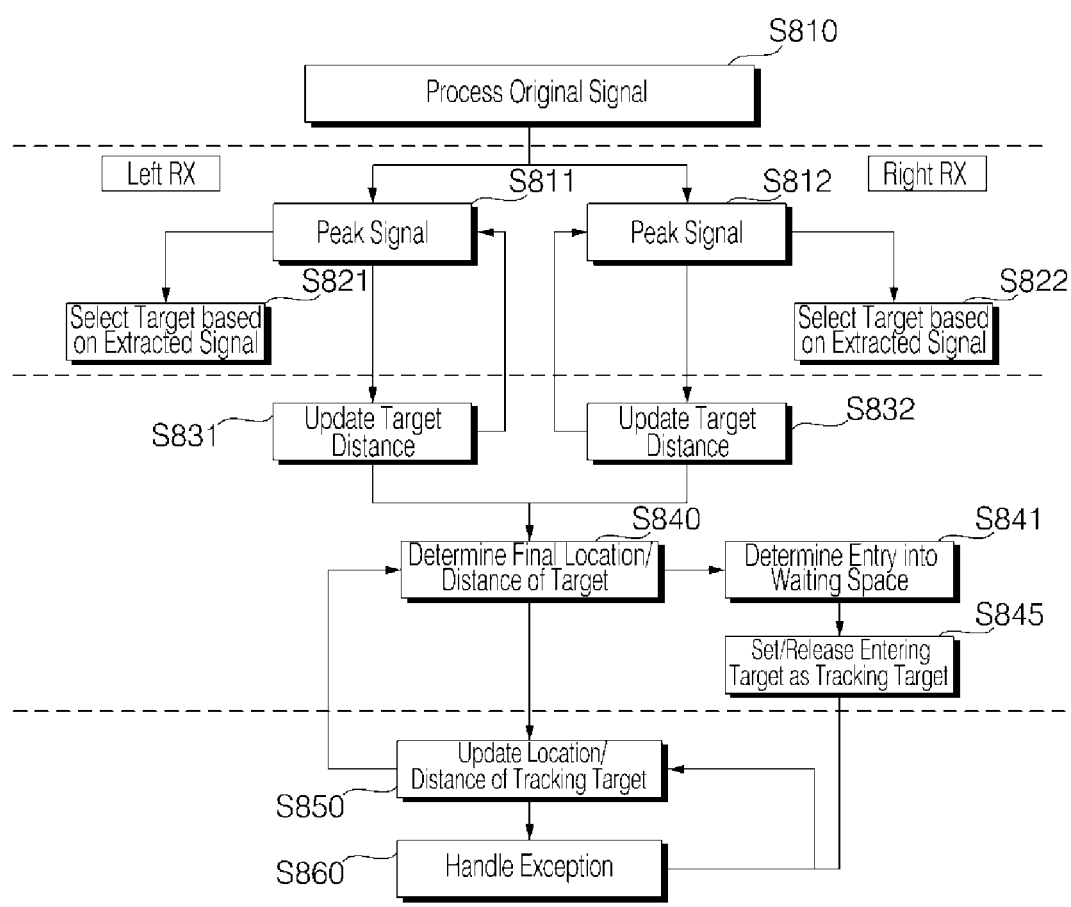

FIG. 8 is a detailed flowchart illustrating the signal process of the processor 130. Referring to FIG. 8, tracking the location of an occupant may include selecting a received signal matching to a transmission signal and extracting a peak signal (S810), selecting a target corresponding to the extracted peak signal (S811, S812, S821, and S822), selecting/releasing the target as a tracking target (S831, S832, S840, S841, and S845), and tracking the location of the target (S850 and S860). In each step, signal processing may be performed on the average value of signals received N times (e.g., 30 times) from each of the left and right first and second reception antennas 121 and 122 of the occupancy detection apparatus 100.

The transmission antenna 111 outputs a transmission signal (S710). The transmission signal is reflected from an occupant and received through the left first and right second reception antennas 121 and 122 (S720). The processor 130 processes the reflected signals received through the first and second reception antennas 121 and 122, to thereby acquire per-sample signal strengths. Herein, a sample may be configured to be a predetermined unit, for example, 4 mm long.

Figure 9:
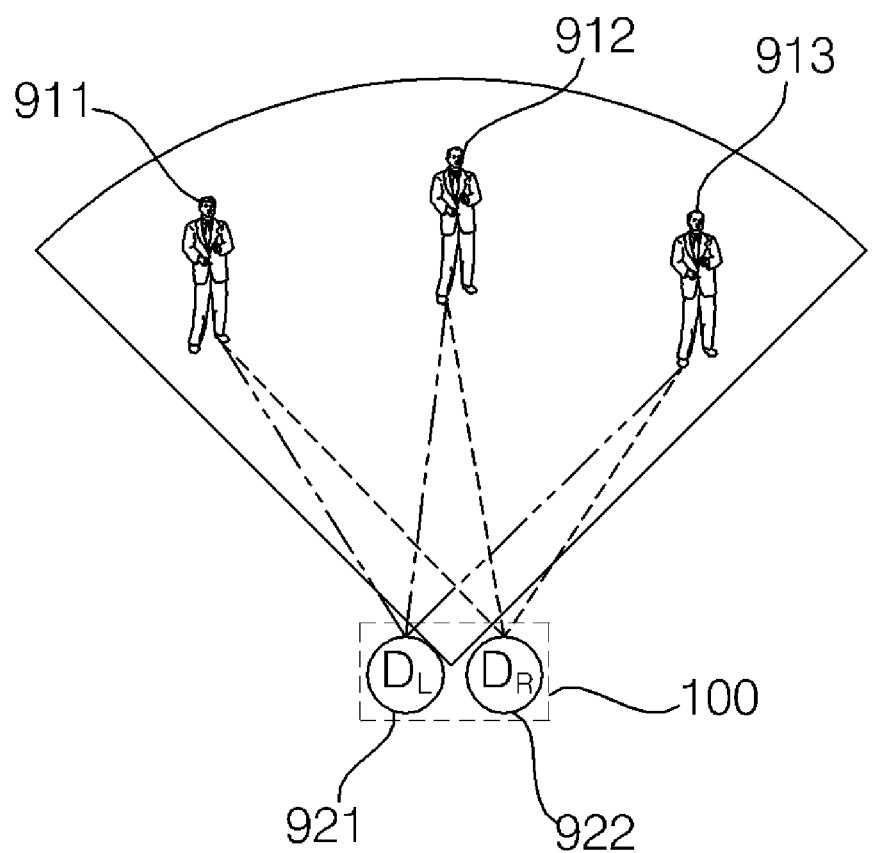

Referring to FIG. 9, according to an embodiment of the present disclosure, the occupancy detection apparatus 100 determines a tracking target based on the distance of a target signal processed in the first and second reception antennas 121 and 122, and tracks the tracking target. According to an embodiment of the present disclosure, the occupancy detection apparatus 100 basically uses the distances DL between the first reception antenna 121 and tracking targets 911, 912, and 913 and the distances DR between the second reception antenna 122 and the tracking targets 911, 912, and 913 in sensing the positions P of the tracking targets 911, 912, and 913 and the distances D to the tracking targets 911, 912, and 913.

The processor 130 extracts peak signals by subjecting the original signal to filtering, background subtraction, and cross-correlation (S810). A basic signal process may be performed in the manner/sequence of the known CLEAN algorithm. A background signal is eliminated from the original signal by background subtraction (S730). The received reflected signals contain a signal reflected from a stationary neighboring object as well as a signal reflected from a target. The signal reflected from the neighboring object should be processed and eliminated as a background. This process is called background subtraction.

Figure 10A:
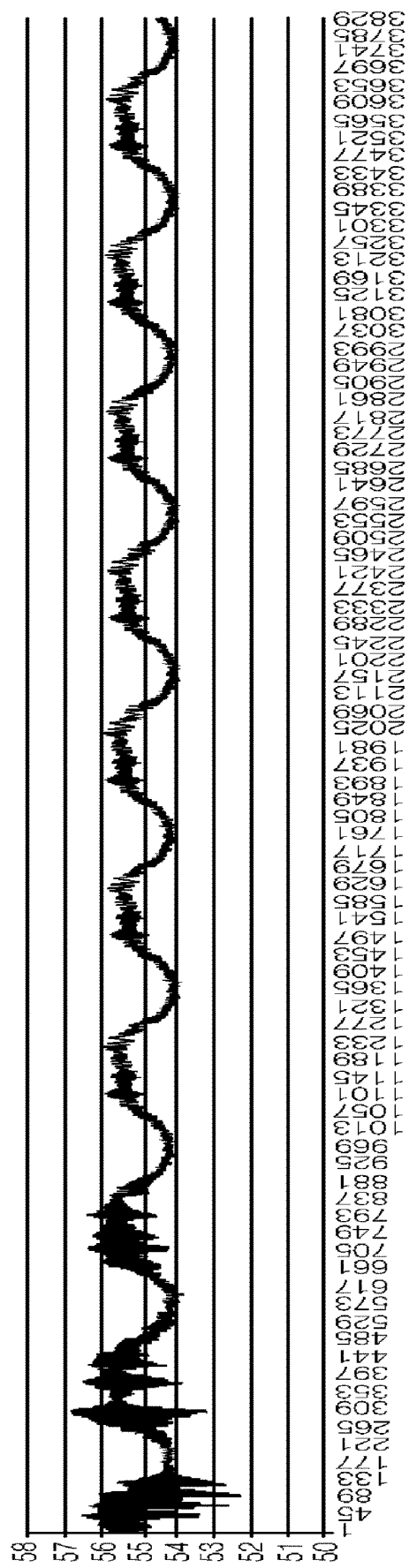
Figure 10B:
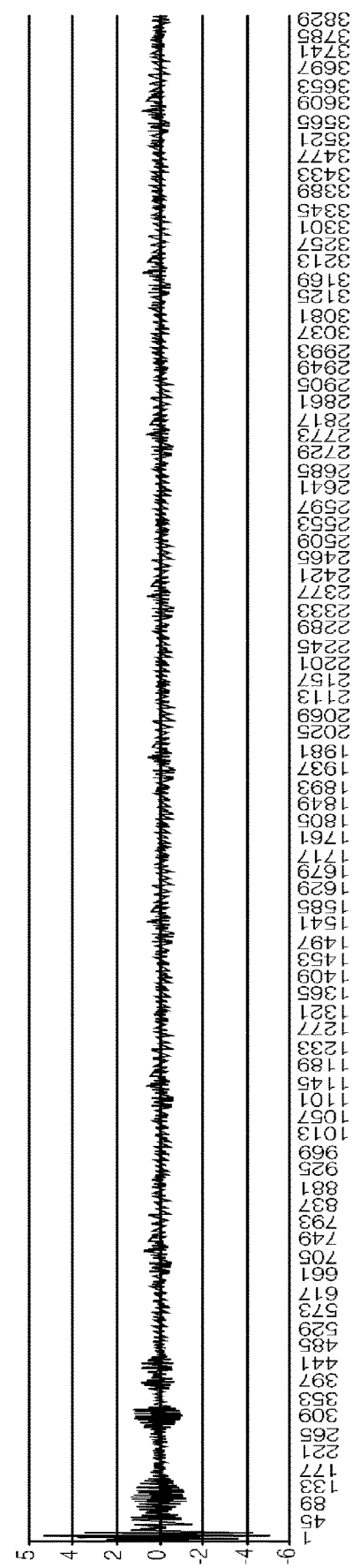

FIGS. 10A to 10F illustrate exemplary signals during the peak signal extraction S810. FIG. 10A is an exemplary view illustrating an original signal, and FIG. 10B is an exemplary view illustrating a signal obtained by normalizing the original signal to zero. The processor 130 may process a signal by normalizing the signal.

Figure 10C:
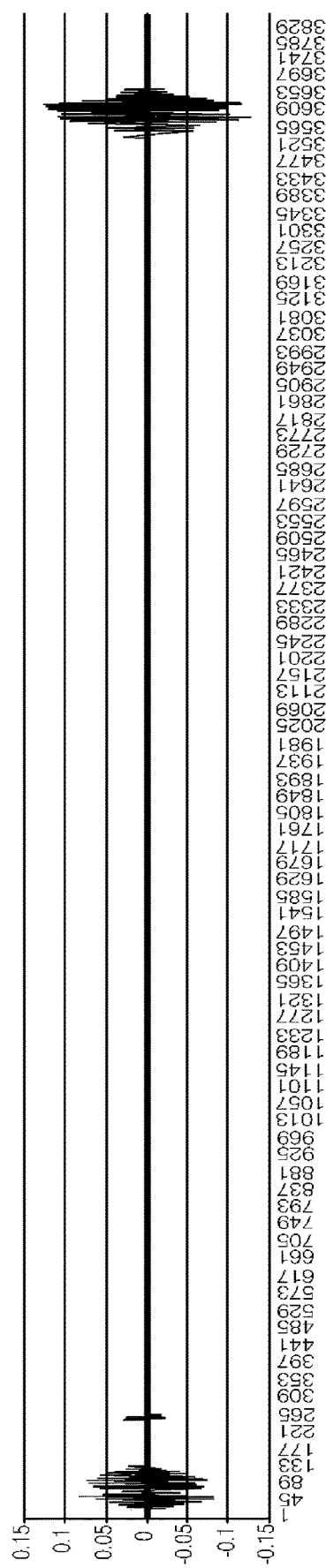

As illustrated in FIG. 10C, the processor 130 may extract a repeated background signal from the normalized original signal by dynamic subtraction. Meanwhile, the occupancy detection apparatus 100 according to an embodiment of the present disclosure may process signals by switching between the first and second reception antennas 121 and 122.

Figure 10D:
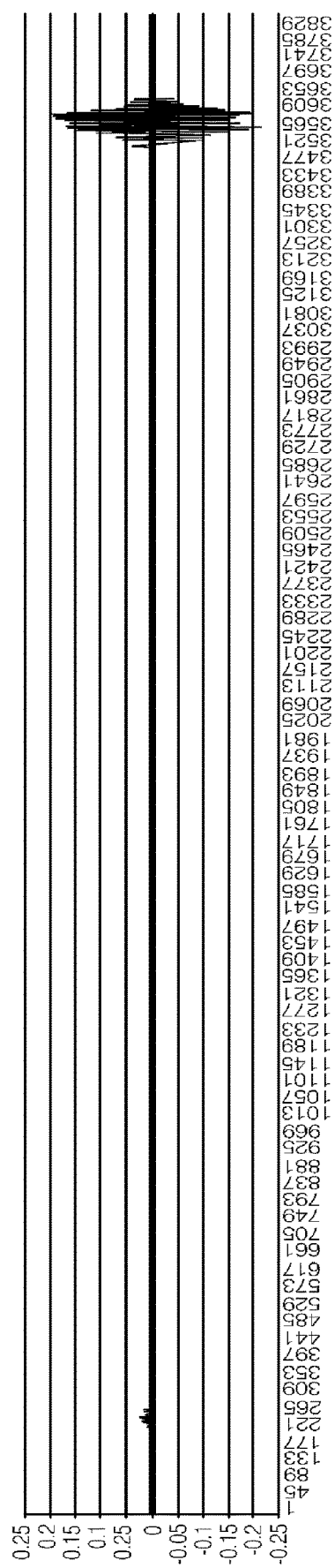

FIGS. 10A, 10B, and 10C illustrate an exemplary process of processing a signal received from one of the first and second reception antennas 121 and 122, and FIG. 10D is an exemplary view illustrating a result of processing a signal received from the other reception antenna 121 or 122 in the same manner. After the background subtraction, a reflected signal (i.e., impulse response) matching to the transmission signal is detected. The processor 130 may determine similarity and correlation over time between the transmission signal and the signals received through the first and second reception antennas 121 and 122. By this operation, a signal determined to be noise with no similarity to and no correlation with the transmission signal is excluded from the received signals.

Figure 10E:
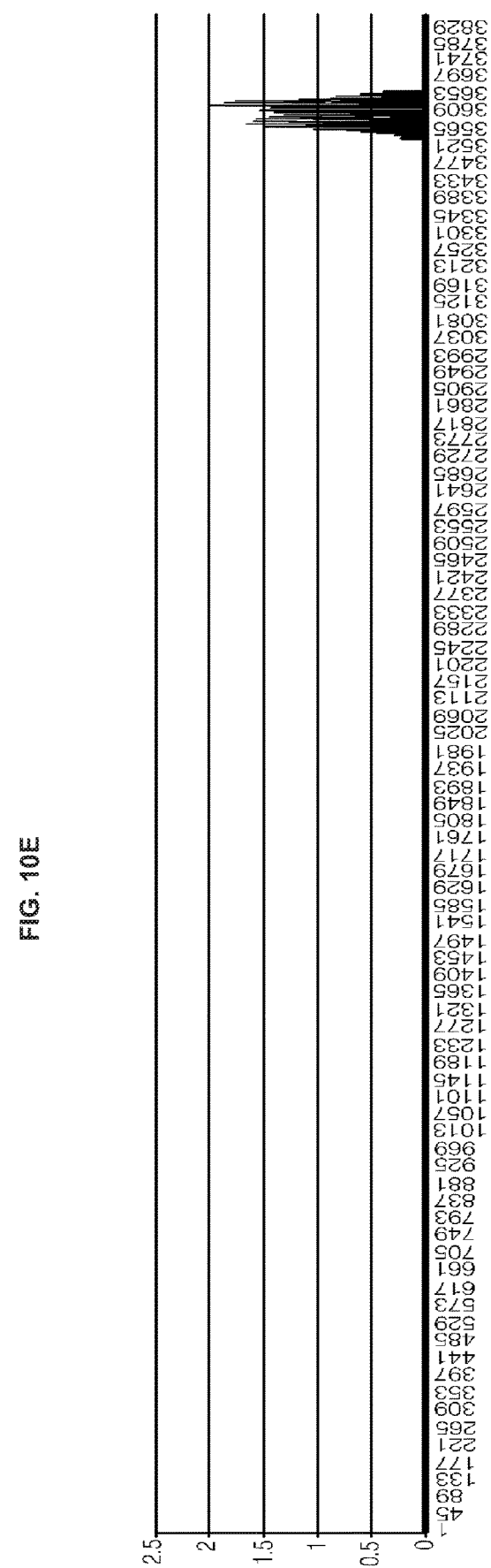
Figure 10F:
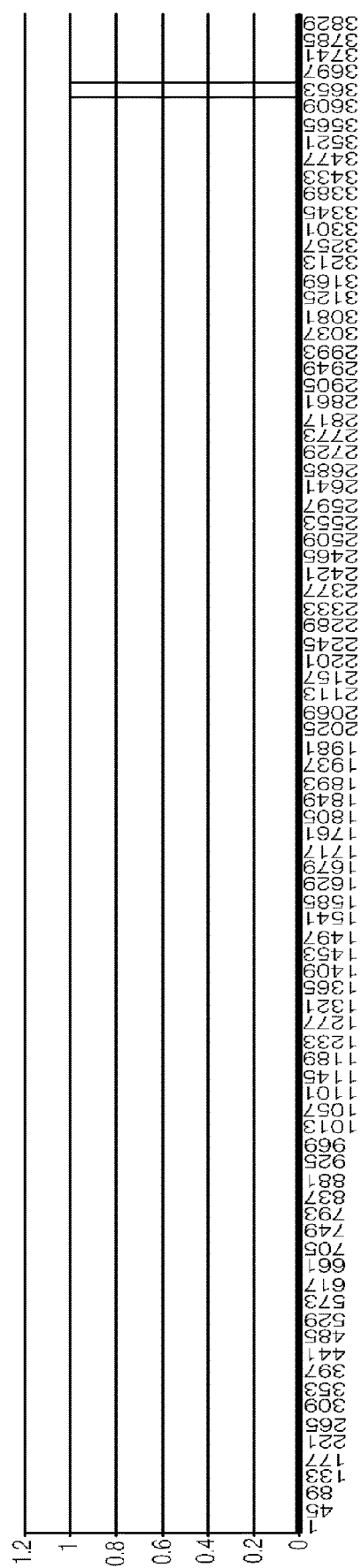

FIG. 10E is an exemplary view illustrating a result of normalizing a signal free of noise by cross-correlation, that is, a signal determined to be correlated with the transmission signal. Referring to FIG. 10F, the processor 130 may extract a peak signal by determining the strengths of the signals after the cross-correlation (S810). In addition, the final extracted signals may be amplified.

In the case of multi-path received signals, the signals may be weak. Then, a threshold may be set, and signals having strengths equal to or greater than the threshold may be selected as final peak signals (S811 and S812). However, if the same threshold is applied to all distances, a signal received from a remote place is less than a signal reflected in a near place in terms of magnitude. As a consequence, an actual target may not be selected as a target.

Therefore, it is more preferred that a processed signal is compensated according to a distance and a different threshold is set according to the distance. Only if the processed signal is compensated according to a distance and a different threshold is applied according to the distance, even a remote target may be sensed. Meanwhile, like the peak signal extraction, a final peak signal may be selected in each of the signals received through the first and second reception antennas 121 and 122 (S811 and S812).

The processor 130 may select a target based on the extracted and selected signals (S821 and S822). The extracted peak signal is subjected to steps S821 and S822 in which it is determined that the target is a person. Temporary signals such as noise and reflected signals may be eliminated from the peak signals extracted in the target selection steps S821 and S822 and the resulting signals may be managed in the memory 150.

It is efficient in terms of speed to manage the extracted peak signals in additional target buffers. According to an embodiment of the present disclosure, the target buffers are managed respectively in the first and second reception antennas, and the processor 130 may perform target selection, update, and abnormality processing by controlling the target buffers.

In the target selection steps S821 and S822, if a peak signal is generated a predetermined number of times (e.g., three times) successively in an adjacent area of the extracted peak signal, it may be determined that the target is a person, and the peak signal may be registered in a target buffer. For example, the distance to the adjacent area spans 200 samples (75 to 80 cm), and may be determined based on a person's stride (80 cm for a 180-cm tall person). Further, a distance measuring algorithm may be performed at an average rate of 320 ms, which means that the algorithm may be performed three times within 1 second. Eventually, a signal sensed successively within 1 second within a person's stride may be buffered in the target buffer.

Figure 10G:
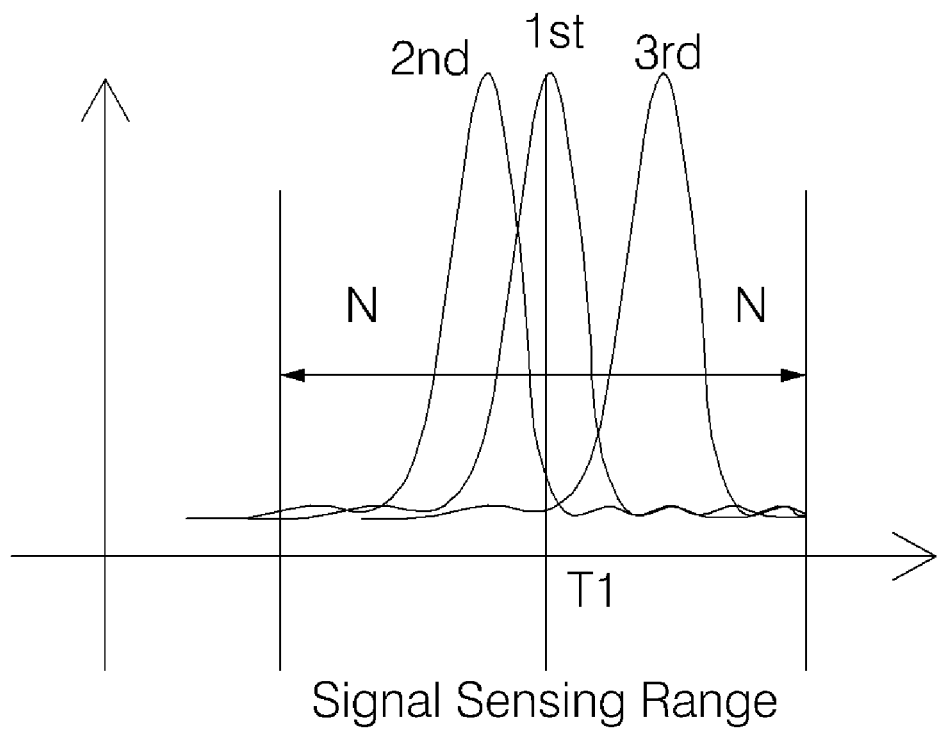

FIG. 10G illustrates an example in which, when second and third signals are sensed within N samples of a first signal, it is determined that a corresponding object is an actually moving object (person) and the corresponding signal is registered in the target buffer. A corresponding distance is updated for the signal registered once to the target buffer, according to a movement (S831 and S832). An extracted peak signal generated within N samples (e.g., 200 samples) is continuously updated based on a final distance. The update may also be performed for each of the first and second reception antennas 121 and 122, like other steps. If the generated signal has not been generated within 200 samples of the signal managed in the target buffer, the signal is subjected as a new signal to the target selection step.

Figure 11A:
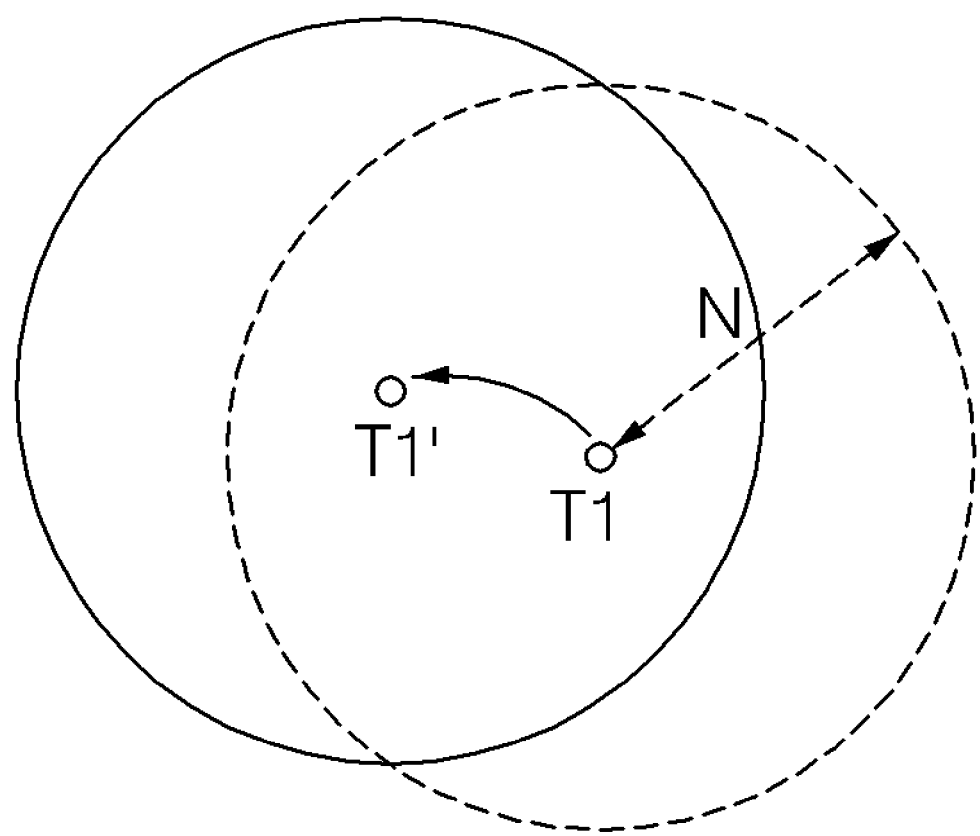
Figure 11B:
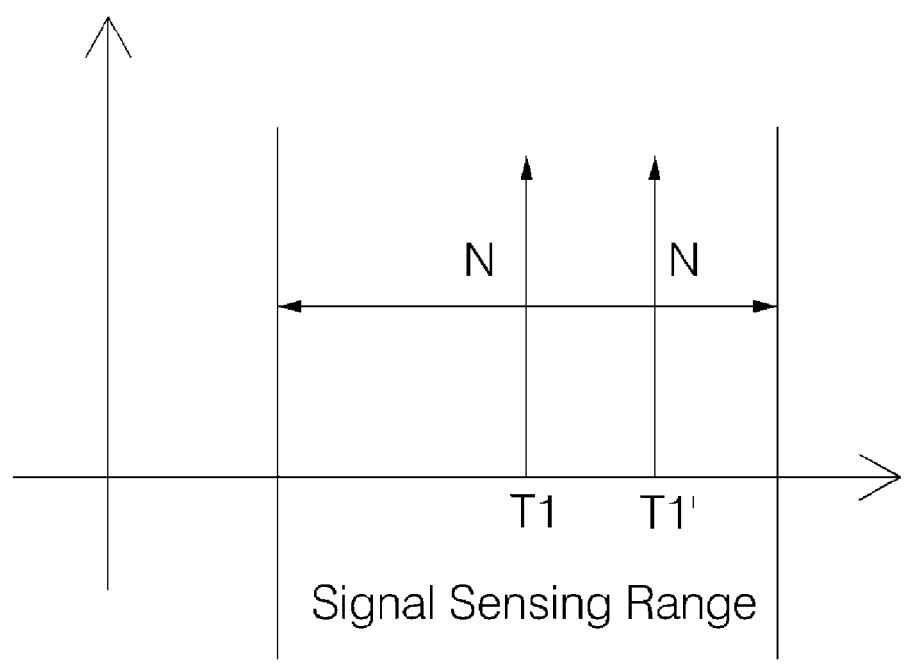
Figure 11C:
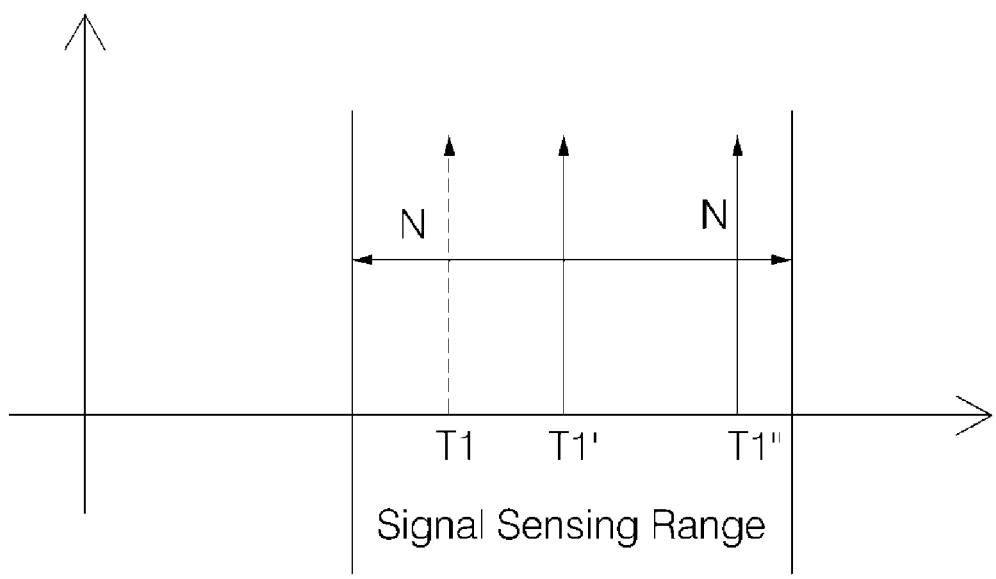
Figure 11D:
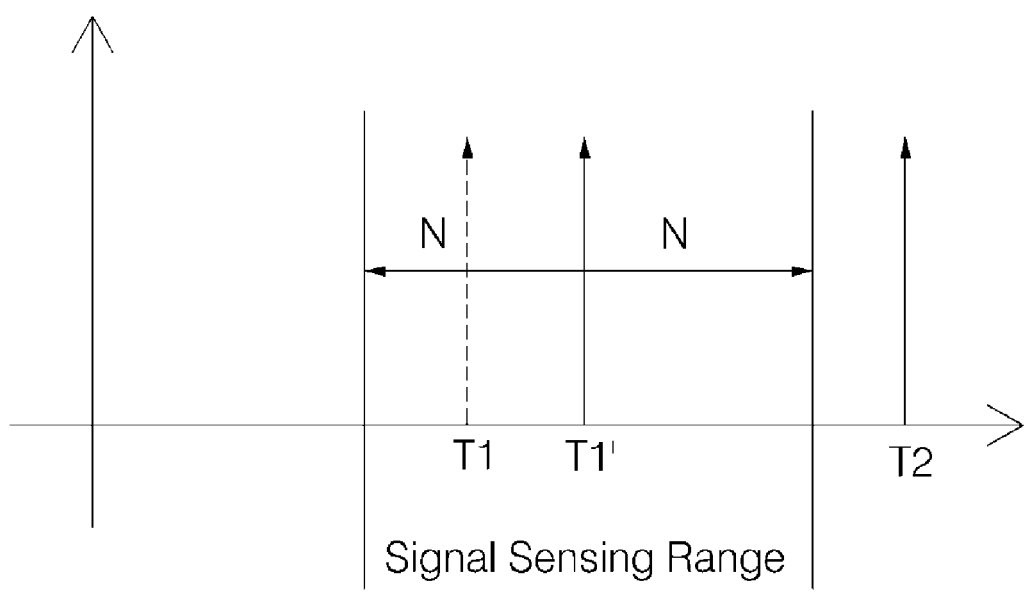

Referring to FIGS. 11A and 11B, if T1' is generated with respect to T1, a corresponding target is updated to T1'. In the examples of FIG. 11C, T1" is also handled in the same manner. On the other hand, as illustrated in FIG. 11D, in the start where the target T becomes T1', if a signal T2 is generated outside a signal sensing range, T2 is regarded as a new target and thus a target update is not performed. In this case, a target selection operation is performed separately for T2.

Meanwhile, in the target update steps S831 and S822, an abnormal situation may occur during the target update. For example, if a signal is not sensed during target update, the processor 130 may control a search range to be extended by a predetermined area, for example, 10 samples in the next period. This is done to extend an update range in case a movement is too fast to be sensed. Meanwhile, a variable search range may be referred to as a moving range factor.

Meanwhile, if the processor 130 does not sense a movement (for about 35 cm for about 3 seconds, in the case of 9 times) even after the update range is increased repeatedly a predetermined number of times (e.g., 9 times), the processor 130 may reset the search range to zero. Further, after the reset, the processor 130 maintains target information in the target buffer for a predetermined time and then excludes the corresponding target. The reason for maintaining the target information for the predetermined time is to manage the target during tracking in consideration of a case in which the target is stationary. On the other hand, if a signal is sensed again within the search range during increasing the search range, the processor 130 may reset the moving range factor to zero and then perform the target update operation.

Figure 12:
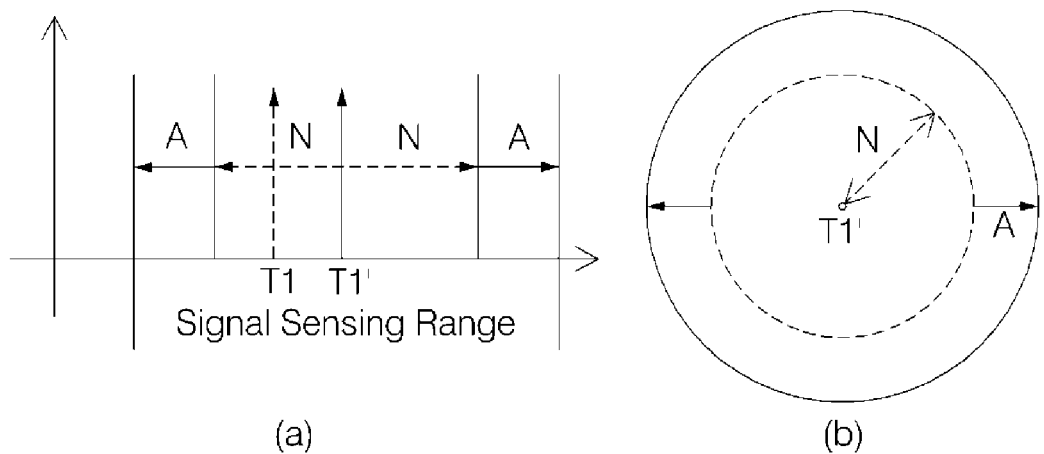

FIG. 12 illustrates an example in which if a signal is not sensed after the target T1 is updated to T1', a signal sensing range is increased by up to A samples. Section (a) of FIG. 12 illustrates a signal sensing range separately as a default search range N and an extended search range A, and section (b) of FIG. 12 intuitively illustrates extension of an actual search range.

According to an embodiment of the present disclosure, the occupancy detection apparatus 100 selects, tracks, and releases a tracking target based on a distance of a target signal processed in the first and second reception antennas 121 and 122. According to an embodiment of the present disclosure, the occupancy detection apparatus 100 first senses and determines the location and distance of a tracking target (S840) and registers the tracking target according to a condition (S845).

According to an embodiment of the present disclosure, if an exceptional situation occurs such as a case in which an object stops or two or more persons are overlapped during tracking (S850), the occupancy detection apparatus 100 performs tracking (S850), while processing the exceptional situation (S860). and releases tracking according to a release condition (S845).

According to an embodiment of the present disclosure, the occupancy detection apparatus 100 may basically use the difference between the distance between a tracking target and the first reception antenna RX1 and the distance between the tracking target and the second reception antenna RX2 in sensing the position P and distance D of the tracking target.

Referring to FIG. 9 again, for signals determined as targets in RX1(DL) and RX2(DR), the difference Ddiff between distances is calculated and compared with a predetermined reference Dcenter, thereby determining the location of the target. For example, if the difference Ddiff is equal to or less than the predetermined reference Dcenter, it is determined that the target is located at the center (position center or PC), and if the difference Ddiff is greater than the predetermined reference Dcenter, it is determined that the target is located to the left (position left or PL) or right (position right or PR). A basic method for determining a distance and a location is given as follows.

$Ddiff=DL-DR$ $Dcenter=(DL+DR)/2$ $P=PC(\text{if } |Ddiff|<Dcenter)$ $PL(\text{if } Ddiff\leq-1*DCcenter)$ $PR(\text{if } Ddiff\geq Dcenter)$ According to an embodiment, the processor 130 may set a specific area adjacent to a sensing range as a waiting space, and track the location of a target that has moved from the waiting space into the sensing range. That is, the processor 130 may determine whether the target has entered the waiting space (S841), select a target that has entered the waiting space as a tracking target (S845), and continuously track the tracking target by updating the location and distance of the tracking target (S850).

Figure 13:
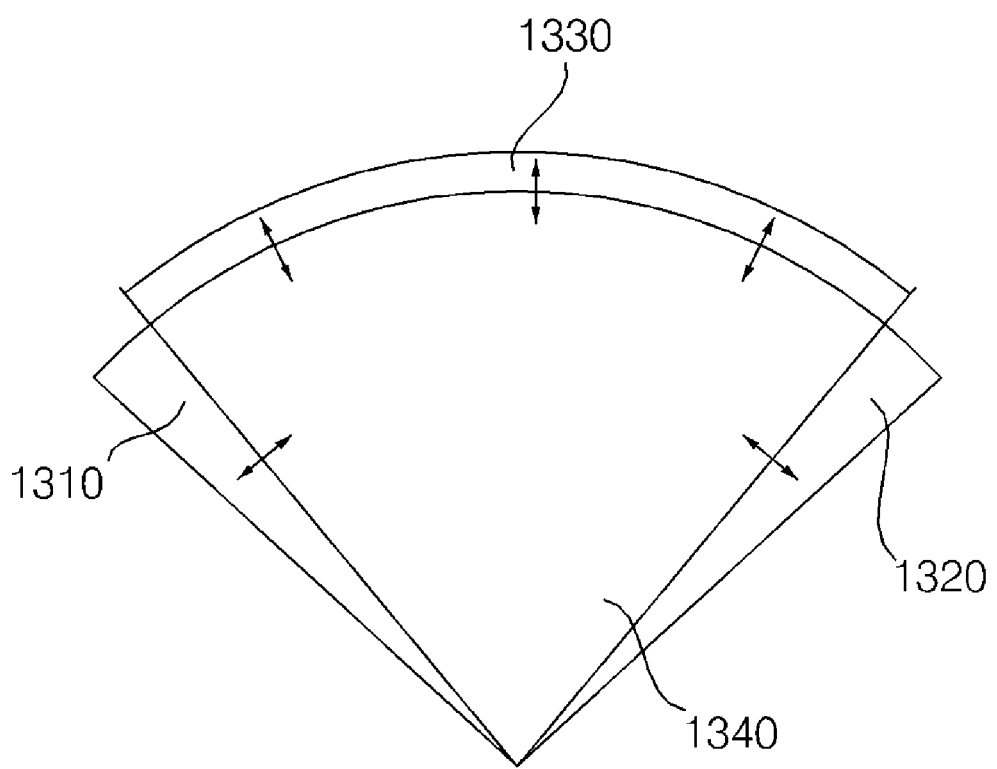

Referring to FIG. 13, a first area 1310 in which only a left target is sensed, a second area 1320 in which only a right target is sensed, and a third area 1330 in which only a remote target is sensed may be set as waiting spaces. The waiting spaces 1310, 1320, and 1330 may be set to be adjacent to a sensing range 1340.

According to an embodiment, only a left reception antenna, for example, only the first reception antenna may be configured to receive a signal from the first area 1310, and only a right reception antenna, for example, only the second reception antenna may be configured to receive a signal from the second area 1320. In this case, the first and second reception antennas 121 and 122 may alternately receive signals from the third area 1330 and the sensing range 1340 by switching.

The waiting spaces 1310, 1320, and 1330 are waiting areas which may be regarded as preparation areas from which a target is about to enter the sensing range 1340 in which the target is tracked. According to an embodiment of the present disclosure, the occupancy detection apparatus 100 may register a tracking target based on a sensed location and distance. A target registered in a tracking buffer may be tracked while being updated based on a distance updated according to reflected signals received through the first and second reception antennas 121 and 122.

When an object sensed in the waiting space 1310, 1320 or 1330 enters the sensing range 1340, the processor 130 may register the object in the memory 150 or the tracking buffer and track the object. If the tracking target moves out of the sensing range 1340 to the waiting space 1310, 1320 or 1330, the processor 130 may release the tracking target from the tracking buffer and regard the released target as a waiting person.

Meanwhile, the tracking buffer may be provided together with the target buffer in the memory 150. Preferably, it is efficient in terms of speed to separately include the tracking buffer from the memory 150 and manage tracking information in the tracking buffer.

Meanwhile, when an exceptional situation occurs, for example, an object stops during tracking, a signal may not be received even though a move-out condition is not satisfied. The exceptional situation may be handled so that the tracking state may be maintained for the target for which the move-out condition is not satisfied (S860). This is done to maintain the target buffer for a predetermined time during target selection and update.

Meanwhile, an exceptional situation may occur, in which two or more persons enter from the same location. For example, when two persons enter the sensing range 1340 from the left third area 1330, a case in which they are separated after entry may be considered. Thus, if a signal is sensed in a specific range from the position and distance of a place from which they enter, for example, in an area apart by 200 to 400 samples, the processor 130 may determine that the persons are separated. If it is determined that the targets are separated, they are registered as new tracking targets without the target selection and tracking registration process. If the persons enter together and are not separated, they may be determined to be a single tracking target.

Figure 14:
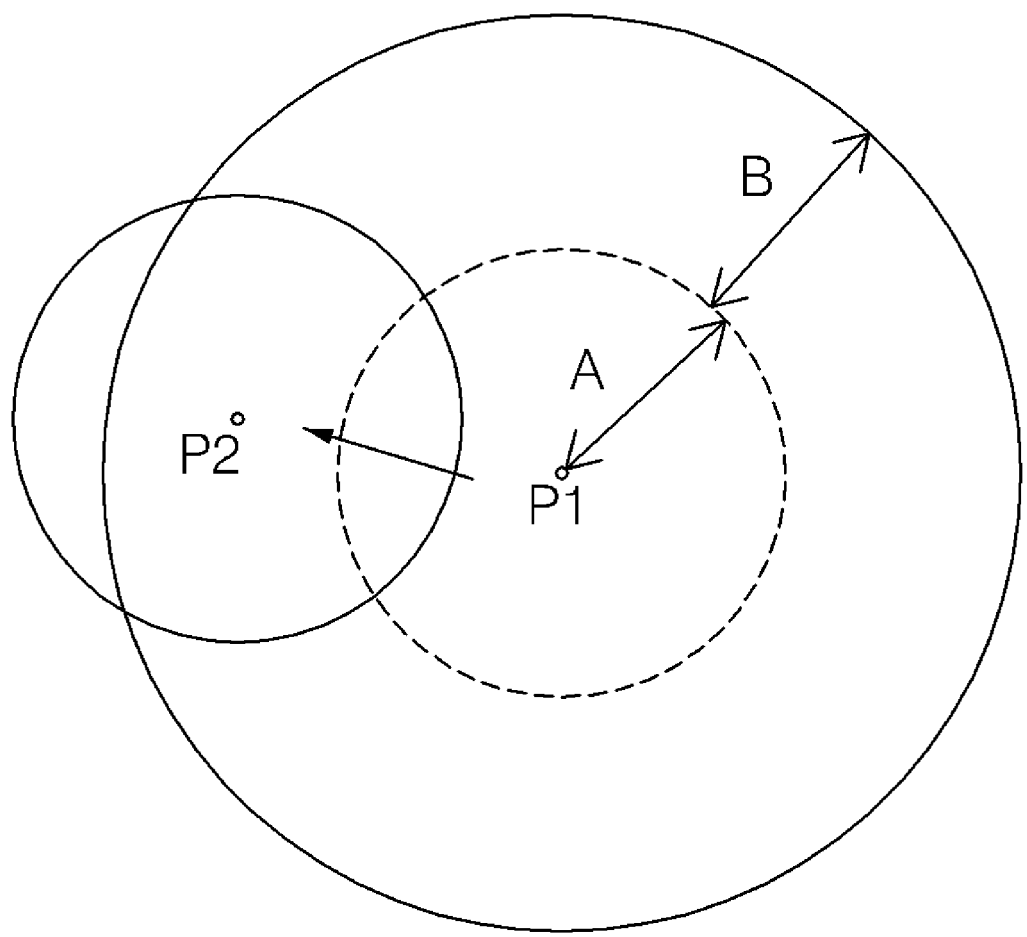

Referring to FIG. 14, if two persons are at the same position P1 and then sensed at P2, P2 may be registered as a new tracking target. Herein, if a signal is sensed at a location apart from the entered position and distance of the persons by A to B samples, the processor 130 may determine that the persons have been separated.

Figure 16:
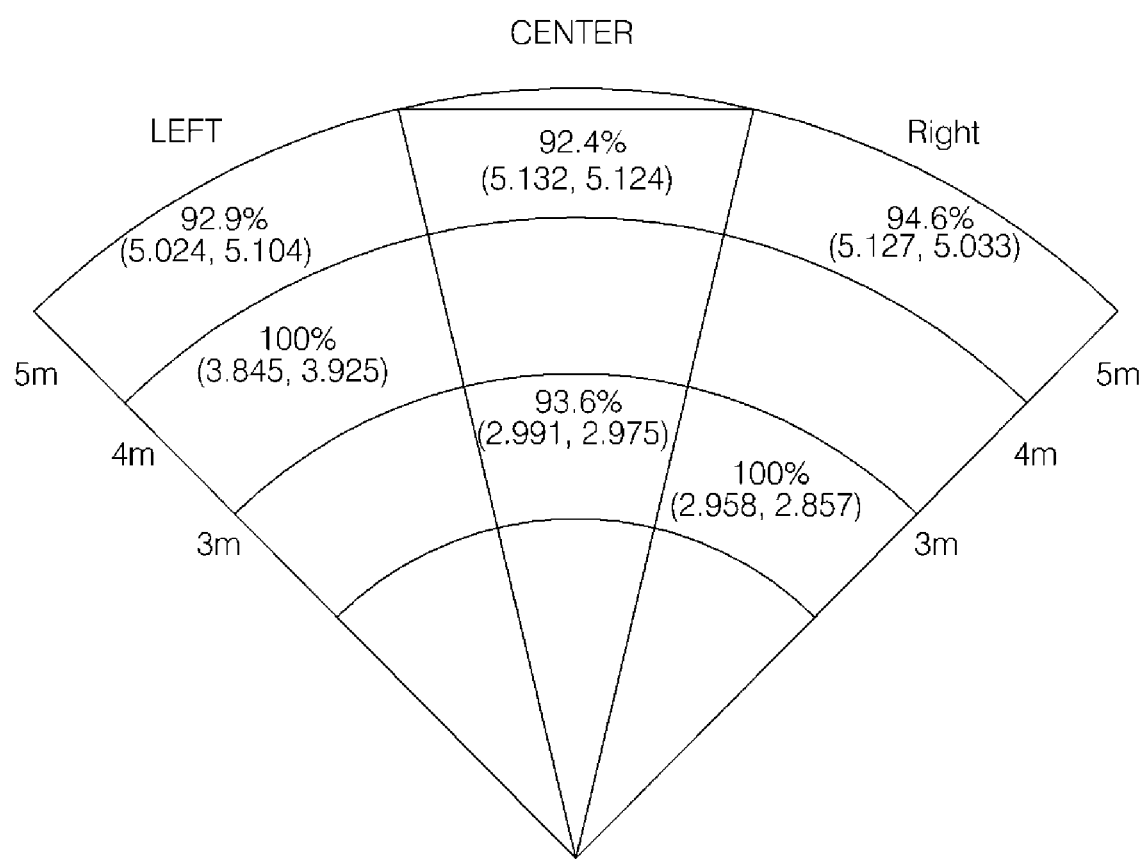
Figure 17:
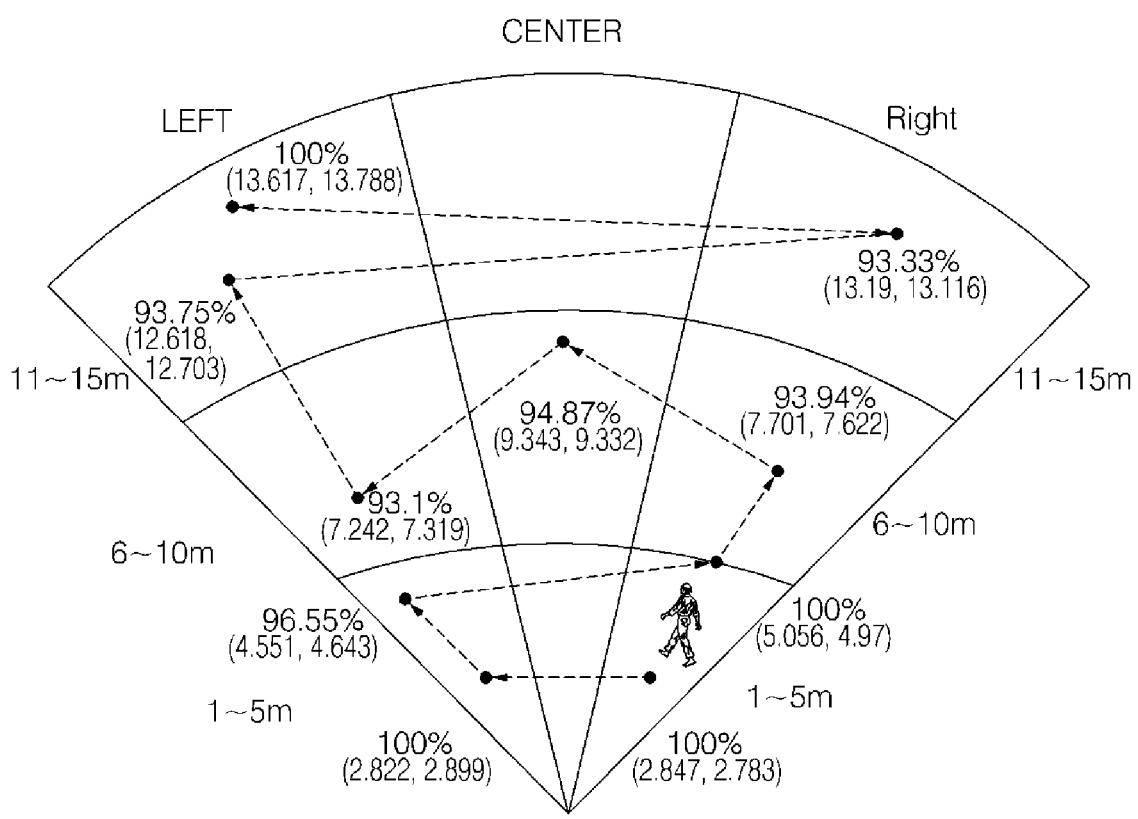

FIGS. 15, 16, and 17 illustrate results of a test in which the occupancy detection apparatus is operated in a space of about 15 m×17 m. In FIG. 15, (a) and (b) illustrate distributions of repeated errors per distance for the left first and right second reception antennas. In (b) of FIG. 15, a specific area 1515 corresponding to a specific area 1510 in (a) of FIG. 15.

Referring to FIG. 15, it is noted that a distribution of errors within 20 cm occupies 90% or above of total errors. The first reception antenna has a distance error ranging from −0.32 m to +0.97 m, and the second reception antenna has a distance error ranging from −0.39 m to +0.76 m. These are error ranges which are possible due to motions of the head, abdomen, and arms in the case of sensing a person.

Referring to FIG. 15, it is noted that a distribution of errors within 20 seconds occupies 92.6% of total errors. It is also noted that the error averages of the first and second reception antennas tend to be equal for the same distance. For example, for 5 m, the first reception antenna has an error of 0.15 m and the second reception antenna has a similar error of 0.16 m.

FIG. 16 illustrates average values of RX1 and RX2 in each zone and results for left, right, and center zones. FIG. 16 describes a test in which an area within 5 m is divided into zones on a 1 m basis according to left, right, and center, and the accuracy of determining the zones. In the test, measurement is performed while persons under test are moving slightly in each zone, and 100 measurement values are taken. Overall errors are observed at the boundaries between the left, right, and the center zones, whereas an accuracy of 100% is achieved in zones not near to the boundaries.

FIG. 17 illustrates tracking accuracies as results of measured distances and determined locations regarding directions in which a person moves and places in which the person stays. In FIG. 17, when a motion is tracked within 2 to 14 m, the presence or absence of an occupant is checked when the occupant enters each zone.

To check entry and exit, a person under test enters a tracking zone from a location apart to the right by 2 to 3 m and moves out of the tracking zone to the left by 14 m, and maintains a normal stride and speed during entry and exit. The person under test stays 3 seconds in each zone and then moves to the next zone, and a tracking result is measured in real time.

In the above scenario, the person under test moves at a normal stride, and stays 2 seconds in each zone. An accuracy of 93.1% is achieved across the total zones, and the tracking target is not lost at all. To check variations in signals of RX1 and RX2 during roaming, the average values of roaming times are checked.

According to the present disclosure, the location of an occupant can be accurately measured and tracked by means of a single occupancy detection apparatus. Further, a plurality of zones can be sensed by the single device through location tracking. Therefore, intelligent illumination/HAVC control is possible, energy consumption is reduced, and as much a service as need is provided to a user, through occupancy detection. Further, the occupancy detection apparatus is easily installed, and reduces fabrication cost and management cost.

According to an embodiment of the present disclosure, a location-based control system for reducing the energy consumption of a building may be realized using the occupancy detection apparatus. The occupancy detection apparatus and the method for controlling the same according to the foregoing exemplary embodiments are not restricted to the exemplary embodiments set forth herein. Therefore, variations and combinations of the exemplary embodiments set forth herein may fall within the scope of the present disclosure.

The method for controlling the occupancy detection apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

Therefore, the present disclosure has been made in view of the above problems, and an aspect of the present disclosure is to provide an occupancy detection apparatus for accurately measuring the location of an occupant by means of a single device, and a method for controlling the same.

Another aspect of the present disclosure is to an occupancy detection apparatus for efficiently measuring and tracking a location of an occupant, while saving fabrication cost and management cost, and a method for controlling the same. Another aspect of the present disclosure is to an occupancy detection apparatus for supporting location-based control to reduce the energy consumption of a building, and a method for controlling the same.

In an aspect of the present disclosure, an occupancy detection apparatus includes a transmitter including one transmission antenna for outputting a transmission signal, a receiver including a first reception antenna and a second reception antenna, each for receiving a reflected signal corresponding to the transmission signal, and a processor for eliminating a background signal corresponding to a background from each of the reflected signals, and extracting a signal reflected from an occupant from each of the reflected signals by extracting a correlation between the transmission signal and the reflected signal free of the background signal.

In another aspect of the present disclosure, a method for controlling an occupancy detection apparatus includes outputting a transmission signal through one transmission antenna, receiving a reflected signal corresponding to the transmission signal through each of a first reception antenna and a second reception antenna, eliminating a background signal corresponding to a background from each of the reflected signals, and extracting a signal reflected from an occupant from each of the reflected signals by extracting a correlation between the transmission signal and the reflected signal free of the background signal.

In another aspect of the present disclosure, an occupancy detection apparatus comprises a transmitter including a transmission antenna to output a transmission signal; a receiver including a first reception antenna and a second reception antenna, each receiving a respective reflected signal corresponding to the transmission signal; and a processor to: remove background noise from each of the reflected signals to form respective processed reflective signals, and extract a signal reflected from an occupant from each of the processed reflected signals based on a correlation between the transmission signal and the respective processed reflected signal.

In another aspect of the present disclosure, a method for detecting an occupant, the method comprises outputting a transmission signal; receiving respective reflected signals corresponding to the transmission signal through a first reception antenna and a second reception antenna; eliminating background noise from the reflected signals to form processed reflected signals; and extracting a signal reflected from the occupant from each of the reflected signals based on a correlation between the transmission signal and the respective processed reflected signals.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An occupancy detection apparatus comprising:
a transmitter including a transmission antenna to output a transmission signal;
a receiver including a first reception antenna and a second reception antenna, each receiving a respective reflected signal corresponding to the transmission signal; and
a processor to:
remove background noise from the reflected signals to form processed reflective signals, and
extract a signal reflected from an occupant from each of the processed reflected signals based on a correlation between the transmission signal and the respective processed reflected signal,
wherein the processor sets a predetermined area adjacent to a sensing range as a waiting space, and tracks a location of the occupant that moves out of the waiting space and into the sensing range based on the extracted signals.

2. The occupancy detection apparatus according to claim 1, further comprising a switch that alternately activates the first reception antenna and the second reception antenna to collect a plurality of reflected signals through each of the first reception antenna and the second reception antenna.

3. The occupancy detection apparatus according to claim 1, wherein the processor alternately switches between the first reception antenna and the second reception antenna to collect a plurality of reflected signals through each of the first reception antenna and the second reception antenna.

4. The occupancy detection apparatus according to claim 1, wherein the transmission signal is an Impulse Response-Ultra WideBand (IR-UWB) impulse signal.

5. The occupancy detection apparatus according to claim 1, wherein the first reception antenna and the second reception antenna are arranged symmetrically with respect to the processor and the transmission antenna.

6. The occupancy detection apparatus according to claim 5, wherein the first reception antenna, the second reception antenna, and the transmission antenna are arranged in the form of 'T' such that a first line extending between the first reception antenna, the second reception antenna, and the processor is orthogonal to second line extending between the transmission antenna and the processor.

7. The occupancy detection apparatus according to claim 5, wherein the first reception antenna, the second reception antenna, and the transmission antenna are arranged in the form of 'Y' such that a first line extending between the first reception antenna and the processor and a second line extending between the second reception antenna and the processor are positioned at a prescribed angle in opposite circumferential directions from a third line that is orthogonal to a fourth line extending between the transmission antenna and the processor.

8. The occupancy detection apparatus according to claim 1, wherein a peak signal matching an occupant signal characteristic is extracted from at least one of the extracted signals, and the occupant is determined based on the peak signal.

9. The occupancy detection apparatus according to claim 8, wherein the processor extracts the peak signal from each of the reflected signals received through the first and second reception antennas.

10. The occupancy detection apparatus according to claim 1, wherein the processor tracks the location of the occupant further based on histories of the reflected signals received through the first and second reception antennas.

11. The occupancy detection apparatus according to claim 1, wherein the processor controls a heating, ventilation, air conditioning (HVAC) system based on the location of the occupant.

12. A method for detecting an occupant, the method comprising:

outputting a transmission signal;
receiving two reflected signals corresponding to the transmission signal through, respectively, a first reception antenna and a second reception antenna;
eliminating background noise from the reflected signals to form processed reflected signals;
extracting a signal reflected from the occupant from each of the reflected signals based on a correlation between the transmission signal and the respective processed reflected signals;
setting a predetermined area adjacent to a sensing range as a waiting space; and
tracking a location of the occupant when the occupant moves out of the waiting space and into the sensing range.

13. The method according to claim 12, wherein receiving the reflected signals includes collecting a respective plurality of reflected signals through each of the first reception antenna and the second reception antenna by alternately switching between the first reception antenna and the second reception antenna.

14. The method according to claim 12, wherein the transmission signal is an Impulse Response-Ultra WideBand (IR-UWB) impulse signal.

15. The method according to claim 12, further comprising extracting a peak signal matching an occupant signal characteristic from at least one of the extracted signals.

16. The method according to claim 15, wherein extracting the peak signal includes extracting respective peak signals from each of the reflected signals received through the first and second reception antennas.

17. The method according to claim 15, further comprising identifying the occupant based on the peak signal.

18. The method according to claim 17, wherein tracking the location of the occupant includes tracking the location of the occupant further based on histories of the reflected signals received through the first and second reception antennas over a plurality of time periods.

19. The method according to claim 12, further comprising controlling a heating, ventilation, air conditioning (HVAC) system based on the location of the occupant.

* * * * *